(12) United States Patent
Sattler et al.

(10) Patent No.: US 11,378,158 B2
(45) Date of Patent: Jul. 5, 2022

(54) METHOD FOR PRODUCING A BELT- OR BAND-SHAPED COMPONENT HAVING AN ELECTRONIC DEVICE

(71) Applicant: ContiTech Antriebssysteme GmbH, Hannover (DE)

(72) Inventors: Heiko Sattler, Wedemark (DE); Svenja Rosenbohm, Hannover (DE); Claus-Lueder Mahnken, Ahausen (DE); Siegfried Reck, Nienburg/Weser (DE); Simon Rosen, Hannover (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 281 days.

(21) Appl. No.: 16/663,407

(22) Filed: Oct. 25, 2019

(65) Prior Publication Data

US 2020/0132161 A1    Apr. 30, 2020

(30) Foreign Application Priority Data

Oct. 26, 2018    (DE) ...................... 10 2018 218 341.4

(51) Int. Cl.
*F16G 5/20* (2006.01)
*F16G 1/28* (2006.01)
(Continued)

(52) U.S. Cl.
CPC ................. *F16G 5/20* (2013.01); *F16G 1/28* (2013.01); *B29D 29/08* (2013.01); *F16G 1/10* (2013.01); *F16G 5/08* (2013.01); *F16G 5/166* (2013.01)

(58) Field of Classification Search
CPC ............ B65G 43/02; F16G 1/28; B29D 29/08
(Continued)

(56) References Cited

U.S. PATENT DOCUMENTS 3,651,506 A * 3/1972 Olaf ....................... B65G 43/02
 324/67
3,750,129 A * 7/1973 Takeno ................... G01N 27/82
 198/810.02

(Continued)

FOREIGN PATENT DOCUMENTS

DE    102009003732 A1    10/2010
DE    102010002551 A1     9/2011
(Continued)

*Primary Examiner* — Henry Y Liu
(74) *Attorney, Agent, or Firm* — Gregory Adams; David L. Cate

(57) ABSTRACT

The invention relates to a method for producing a belt- or band-shaped component made of elastomer material, which is driven to run around under tensile stress and which has an electronic circuit or electronic device installed in the component, the component having tension members or cords which are arranged in the longitudinal direction, wherein, during the fabrication and before the vulcanization of the component blank, planar intermediate plies or strips made of material which cannot be crosslinked by vulcanization are inserted into the blank structure in subregions of the blank, wherein, after the fabrication, the blank is completely vulcanized to form the component and, where appropriate, cut or trimmed, and wherein the intermediate plies or strips are then removed from the component through correspondingly incorporated or method-intrinsically formed openings, and an electronic circuit or electronic device is introduced into the thus resulting planar empty space or interspace in the component.

22 Claims, 1 Drawing Sheet

(51) Int. Cl.
*B29D 29/08* (2006.01)
*F16G 1/10* (2006.01)
*F16G 5/08* (2006.01)
*F16G 5/16* (2006.01)

(58) Field of Classification Search
USPC .................................. 474/205, 260, 261
See application file for complete search history.

(56) References Cited

U.S. PATENT DOCUMENTS

| | | | | |
|---|---|---|---|---|
| 4,621,727 A * | 11/1986 | Strader | ............... | B65G 43/02 340/676 |
| 4,854,446 A * | 8/1989 | Strader | ............... | B65G 43/02 340/676 |
| 4,895,555 A * | 1/1990 | Watanabe | ............... | F16G 1/28 474/263 |
| 5,536,214 A * | 7/1996 | Akita | ............... | F16G 1/28 474/268 |
| 5,807,194 A * | 9/1998 | Knutson | ............... | B29D 29/08 474/237 |
| 5,976,044 A * | 11/1999 | Kuyama | ............... | F02B 61/02 474/146 |
| 6,047,814 A * | 4/2000 | Alles | ............... | B65G 43/02 198/810.02 |
| 6,189,412 B1 * | 2/2001 | Tsubata | ............... | F16H 61/0009 74/606 R |
| 6,264,577 B1 * | 7/2001 | Hutchins | ............... | B60C 23/0493 198/810.02 |
| 6,715,602 B1 * | 4/2004 | Gartland | ............... | B65G 43/02 340/676 |
| 8,069,975 B2 * | 12/2011 | Wallace | ............... | B65G 45/02 198/810.02 |
| 8,662,290 B2 * | 3/2014 | Twigger | ............... | B65G 43/06 198/810.01 |
| 8,910,777 B2 * | 12/2014 | Minkin | ............... | B65G 15/36 198/810.02 |
| 8,991,594 B2 * | 3/2015 | Nakamura | ............... | B65G 43/02 324/228 |
| 2004/0149049 A1 * | 8/2004 | Kuzik | ............... | B65G 43/02 73/862.453 |
| 2004/0262132 A1 * | 12/2004 | Pauley | ............... | B65G 43/02 198/810.02 |
| 2006/0055531 A1 * | 3/2006 | Cook | ............... | B60C 23/0408 340/539.22 |
| 2006/0114452 A1 * | 6/2006 | Schnell | ............... | B65G 43/02 356/237.1 |
| 2008/0257692 A1 * | 10/2008 | Wallace | ............... | B65G 43/02 198/810.02 |
| 2009/0101482 A1 * | 4/2009 | Kusel | ............... | B65G 43/02 198/810.01 |
| 2012/0309573 A1 * | 12/2012 | Well | ............... | F16G 1/10 474/205 |
| 2012/0323371 A1 * | 12/2012 | Ballhausen | ............... | F16G 1/28 700/275 |
| 2013/0001840 A1 * | 1/2013 | Reck | ............... | F16F 9/3292 156/60 |
| 2013/0040771 A1 * | 2/2013 | Well | ............... | F16G 1/28 474/205 |
| 2014/0131176 A1 * | 5/2014 | Minkin | ............... | B65G 43/02 198/810.02 |
| 2014/0243134 A1 * | 8/2014 | Kucharczyk | ............... | F16G 1/28 427/389.9 |
| 2014/0342110 A1 * | 11/2014 | Zhu | ............... | C08G 18/7657 428/36.9 |
| 2016/0061088 A1 * | 3/2016 | Minnichsoffer | ............... | F16H 55/56 60/320 |
| 2017/0254405 A1 * | 9/2017 | Ballhausen | ............... | F16G 1/10 |

FOREIGN PATENT DOCUMENTS

| | | |
|---|---|---|
| DE | 102010016359 A1 | 10/2011 |
| JP | 2011073806 A | 4/2011 |
| KR | 20080111799 A | 12/2008 |
| WO | 9318315 A1 | 9/1993 |
| WO | 2005030621 A1 | 4/2005 |
| WO | 2010033526 A1 | 3/2010 |
| WO | 2017207123 A1 | 12/2017 |

* cited by examiner

METHOD FOR PRODUCING A BELT- OR BAND-SHAPED COMPONENT HAVING AN ELECTRONIC DEVICE

FIELD

The invention relates to a method for producing a belt- or band-shaped component made of elastomer material.

BACKGROUND

Belt- or band-shaped components, for instance drive belts in capital-intensive machines and installations, require careful and damage-preventing maintenance. The drive belts used there are therefore currently replaced after a comparatively short use period in order to reduce the risk of damage to the machines or installations and thus costly downtimes. It has already been repeatedly proposed to equip such drive belts with electronics which are wirelessly connected to a remotely arranged monitoring system. The state data of the drive belt that are detected by sensors of said electronics are used to provide belt state-dependent maintenance of the machines or installations, whereby the number of downtimes for maintenance reasons is reduced as a result.

BRIEF DESCRIPTION OF THE DRAWINGS

The invention is explained more fully below with reference to an exemplary embodiment which is illustrated in the appended drawing, in which.

DETAILED DESCRIPTION

Figure 1:
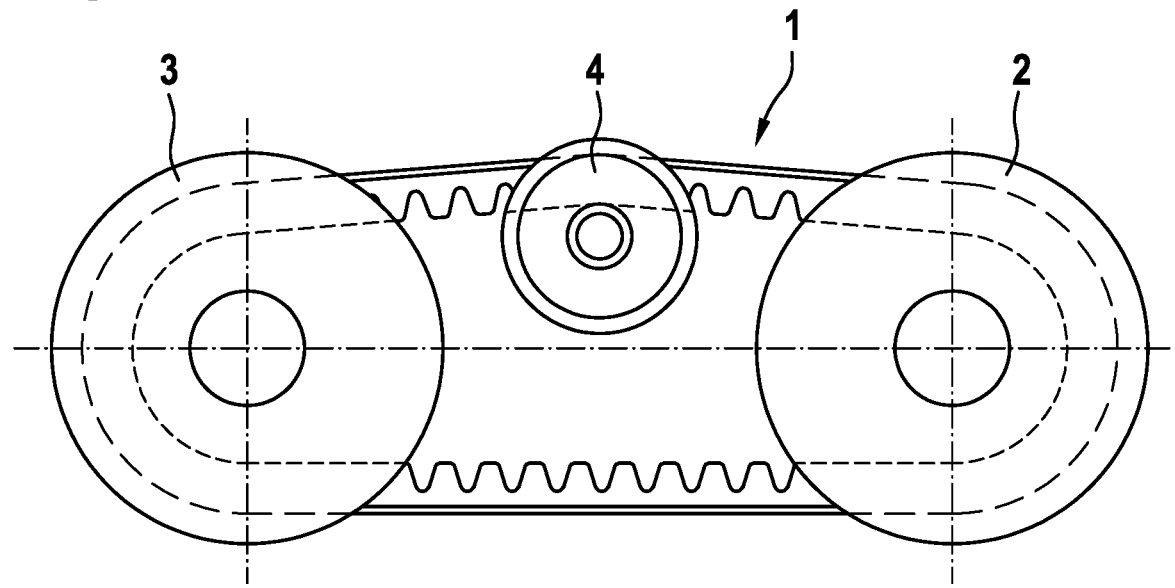
FIG. 1 shows a simple belt drive having a wide V-belt for a combine harvester, which is produced by the method according to the invention.

The invention relates to a method for producing a belt- or band-shaped component made of elastomer material, which is driven to run around under tensile stress and which has an electronic circuit or electronic device installed in the component, the component having tension members or cords which are arranged in the longitudinal direction. The invention also relates to such a component, namely a drive belt. Such electronic circuits or electronic devices in band-shaped components made of elastomer material, then designed as sensors, processing devices and also transmitting and receiving devices for data and signals, can be used to measure state variables of the component and allow them to be forwarded wirelessly to a remotely arranged receiving unit.

Belt- or band-shaped components, for instance drive belts in capital-intensive machines and installations, require careful and damage-preventing maintenance. The drive belts used there are therefore currently replaced after a comparatively short use period in order to reduce the risk of damage to the machines or installations and thus costly downtimes. It has already been repeatedly proposed to equip such drive belts with electronics which are wirelessly connected to a remotely arranged monitoring system. The state data of the drive belt that are detected by sensors of said electronics are used to provide belt state-dependent maintenance of the machines or installations, whereby the number of downtimes for maintenance reasons is reduced as a result.

If drive belts are equipped with such electronic devices such that measurement variables and/or identification data can be detected and can be wirelessly transmitted during running operation, a replacement which is amenable to wear and safe from confusion is thus possible. However, during operation, the electronic components in or on the belt are exposed to the customary loading in a belt drive, namely dust, high temperatures and, precisely in the case of drive belts, changing extensions and tensile loading or compressions. At least the loading by dust and externally acting environmental influences is countered in the prior art by virtue of the electronic components being encapsulated in the drive belt.

Thus, DE 10 2009 003 732 A1 discloses a flexible drive belt in whose elastomer material there is formed a pocket in which a sensor and a flexible piezo element electrically connected thereto are arranged. The flexible piezo element generates, as a result of belt movements and by a periodic change of its bending radius, electrical energy portions which serve for the energy supply of the sensor. According to a first embodiment in said document, the piezo element is fixedly and nonreleasably connected to the belt material by being vulcanized in. According to a second embodiment, there is provision that the drive belt has a pocket into which, after the vulcanization of the belt, the flexible piezo element can be plugged with the sensor and electrical connecting elements in such a way that the piezo element is coupled to the movements of the belt during operation. The fixed connection between the piezo element and the belt material means that, during an operationally induced movement of the belt, said element is excited to generate energy. The pocket formed in the material of the belt is irreversibly closable after the sensor and the piezo element have been plugged in.

It is assessed to be disadvantageous that, on account of the vulcanization temperature which is up to 180° C. and the vulcanization pressure of up to 1.5 MPa, vulcanizing in the electronics can damage the latter. The production of a pocket in the material of the drive belt can also be disadvantageous if the belt structure becomes thereby damaged or at least nonhomogeneous. In our assessment, the last-mentioned disadvantages are also found in the drive belt known from DE 10 2010 002 551 A1, in which electronics having an RFID transponder are vulcanized into the material of the drive belt.

Moreover, the customary production of belt coils on a belt building drum carries the risk that, after the vulcanization of the coil, and upon the subsequent separation thereof into separate drive belts, the electronics installed therein cannot be exactly located, with the result that the electronics are destroyed by the cuts necessary for separation. This can particularly occur when, for example to form belt teeth, flow processes have taken place in the coil material and a previously known position of the electronics has thus changed. In addition, it is possible for damage to occur to the vulcanized-in electronics when the belts separated from the coil are turned inside out.

Furthermore, during operation, electronic circuits vulcanized into drive belts are exposed to very frequent extensions and compressions while the drive belt runs around on belt pulleys. The same applies to electronics parts which are installed for instance in conveyor belts which are guided via drums or rollers over many kilometers and transport bulk material. Since customarily the electronics parts themselves, or else the carrier films to which such electronics parts are applied, react completely differently to extensions and compressions than the surrounding elastomer material, too intimate a connection between the electronics parts and the surrounding material can lead to tears or fractures in the circuits.

Against this background, the object on which the invention is based is to provide a belt- or band-shaped component made of elastomer material, which is driven to run around under tensile stress and which has an electronic circuit or electronic device installed in the component, preferably to present an endless drive belt which is indeed equipped with electronics for detecting state variables of the component/belt, but does not have the described disadvantages during production and in operation. Therefore, the electronics arranged on said component/belt are not intended in the conventional manner to be vulcanized in the base material of the component or of the belt, and the electronics are not intended to be exposed to any extensions and/or compressions during the operationally induced movement of the belt.

To achieve this object, a method for producing such a belt- or band-shaped component having the features of the main claim is proposed. Advantageous developments are defined in the dependent claims. Also proposed is a method for producing a drive belt having fabric plies and also a correspondingly designed drive belt.

Here, during the fabrication and before the vulcanization of the component blank, planar intermediate plies or strips, even for instance in the form of patches, made of material which cannot be crosslinked by vulcanization are inserted into the blank structure in subregions of the blank. After the fabrication, the blank is completely vulcanized to form the component and, where appropriate, cut or trimmed.

The intermediate plies or strips are then removed from the component through correspondingly incorporated or method-intrinsically formed openings, and an electronic circuit or electronic device is introduced into the thus resulting planar empty space or interspace in the component, with the result that the empty space or interspace is used as a receiving space for the circuit. The electronic circuit or electronic device is formed in its spatial or areal extents in such a way that the interspace or receiving space is only partially filled, at any rate is only partially filled in the lateral main loading direction. The electronic circuit or electronic device is thus encapsulated and protected from environmental influences and at the same time arranged substantially "floatingly" with respect to the main loading directions, with the result that no compressions or tensile loading can be exerted on the circuit or its carrier.

A belt- or band-shaped component produced in such a way having an electronic circuit or electronic device withstands, by contrast to the previous embodiments, permanent extensions and compressions due to the loading in a belt drive and achieves at least the same service life as a comparable component without electronic devices.

An advantageous development of the method according to the invention for producing a component, which is provided on at least one side with at least one fabric ply which is embedded in or close to the outer surface of the traction belt, consists in the fact that, during the fabrication and before the vulcanization of the component blank, one or more planar intermediate plies or strips which are arranged adjacently to the fabric plies and are made of material which cannot be crosslinked by vulcanization are inserted into the blank structure in subregions of the blank.

An arrangement in or between the fabric plies ensures that the material matrix surrounding the electronic circuits or the electronic device is subjected to relatively few movements since it is reinforced by the inserted fabric. Such an embodiment of the production method and such an arrangement of the electronic circuits improves the durability of the component or drive belt and its installed components.

A particularly advantageous embodiment of the method according to the invention consists in the fact that the intermediate plies are formed as strips made of polytetrafluoroethylene (Teflon) or else of silicone paper. Such strips are universally obtainable as commercially available and inexpensive products and can be cut to size into any desired shapes and tailored to the production process.

An advantageous embodiment of the method according to the invention consists in the fact that the electronic circuit or electronic device is arranged on an electronics carrier, preferably being formed as a film circuit or as a printed circuit applied to film. This facilitates the introduction of the electronic circuit into the interspace or receiving space. In addition, a wide variety of circuits with different sensors and transmission devices as prefabricated electronic circuits prepared to the customer's wish can be introduced into the receiving space.

A further advantageous embodiment of the method according to the invention consists in the fact that the electronic circuit or electronic device, preferably the electronics carrier, is fixed, preferably adhesively bonded, via a linear, patch-like or punctiform connection, in the planar empty space or interspace, that is to say in its receiving space. Such an often punctiform fixing affords the substantially "floating mounting" without an undefined position of the electronic component being able to result, for example a displacement of the electronic device into a unfavourable emitting or transmitting position.

A further advantageous embodiment of the method according to invention consists in the fact that the introduced electronic circuit or electronic device has a temperature sensor, preferably a SAW sensor, and the planar empty space or interspace is filled with an elastic heat-conducting paste after the introduction of the circuit. Such a filling can then perform the fixing function and at the same time allow excellent heat transfer to the sensor system within the electronic circuit.

An advantageous variant of the method according to the invention for producing a drive belt having a drive side, a rear side and lateral surfaces, in which the fabrication occurs on a building drum and in the form of a cylindrical blank whose length corresponds to a multiple of the drive belt width, consists in the fact that, during the fabrication and before the vulcanization of the cylindrical blank, intermediate plies or strips which extend at least over partial lengths of the cylindrical blank and are made of material which cannot be crosslinked by vulcanization are inserted into the blank structure in subregions of the blank, wherein, after the fabrication, the blank is completely vulcanized and cut into individual drive belts, wherein the intermediate plies or strips are then removed from the separated drive belts, and the electronic circuit or electronic device is introduced into the thus resulting planar empty space or interspace. The method according to the invention can thus be easily integrated into the sequence of the customary and known production methods of drive belts.

An advantageous embodiment of the method according to the invention for producing a drive belt consists in the fact that the intermediate plies or strips are inserted into the cylindrical blank in such a way that, after the cutting or separation of the drive belts, they are accessible and removable, or can be extracted, on or from at least one lateral surface of the drive belt. This occurs for example by virtue of the fact that Teflon strips are introduced into the structure over the entire length or width of the fabrication drum and, after cutting or separating the drive belts, project out of the cut surfaces or are visible there and can be extracted.

An advantageous embodiment of the method according to the invention for producing a drive belt consists in the fact that, during the fabrication of the cylindrical blank, intermediate plies or strips which extend at least over parts of the length of the cylindrical blank and are made of material which cannot be crosslinked by vulcanization are inserted in certain portions into the blank structure in subregions of the blank in such a way that the ends of the strips project out of the fabricated blank through incisions incorporated into the outer fabric plies during the fabrication. Such an embodiment of the method makes it possible for example for relatively wide toothed belts or else V-ribbed belts to be produced, in particular cut, wherein the access to the planar empty space or interspace or receiving space for the electronic circuit or electronic device is then potentially possible even from the rear side of the drive belt.

An advantageous embodiment of the method according to the invention consists in the fact that, after introducing the electronic circuit or electronic device into the empty space or interspace/receiving space, the accesses or openings to the empty space or interspace that are situated in or close to the lateral surfaces of the drive belt are closed again, preferably by melting on or melting in a thermoplastic compound or film. This ensures a reliable encapsulation and prevents a situation in which the electronic components or circuits are pressed out of their receiving spaces in an unforeseen manner.

An advantageous embodiment of the method according to the invention consists in the fact that, for producing a drive belt provided with a plurality of fabric plies, the intermediate plies made of material which cannot be crosslinked by vulcanization are inserted between two fabric plies. As already described above, an arrangement between the fabric plies ensures that the material matrix surrounding the electronic circuits or the electronic device is subjected to relatively few movements and improves the durability of the installed electronics.

An advantageous embodiment of the method according to the invention consists in the fact that at least one of the fabric plies is designed to be extensible and is sewn in or welded in in strip form between the other fabric plies, with it being particularly advantageous if the fabric plies are welded or adhesively bonded to the edges of the drive belts. As a result, the same resistance can be ensured in particularly highly stressed edge regions as is present at the remainder of the circumference where no receiving space is provided.

The production method is particularly suitable for providing the customary and widely used drive belts with an installed electronic circuit or electronic device without overly changing or influencing the known production thereof. Toothed belts, V-belts, multi V-belts, wide V-belts or V-ribbed belts, and of course also flat belts and other drive belts, can in this way provide a considerable widening of their use possibilities and allow reliable maintenance and inspection in the belt drives provided therewith.

The same applies to conveyor belts having a drive side and a support side for items to be conveyed. Here, too, the installation of an installed electronic circuit or electronic device by the method according to the invention appreciably widens their use range.

In general, one advantage of the production according to invention is also seen in the fact that, owing to the equipping of the belt with the electronics only after the complete finishing thereof, the electronics can be mounted on the radial outer side of the belt to suit individual customer wishes. As a result, the production process is split to a certain extent between the belt manufacturer and the user. Consequently, the user has, for example, the possibility of specifying the measuring point or a plurality of measuring points on his/her belt and, where appropriate, equipping the belt with the electronics himself/herself.

Moreover, a drive belt equipped according to the invention with the receiving space and the electronics fastened therein has no adverse effects in terms of its mechanical strength or continuous loadability, since no change has been made to its internal structure. As a result, customer approval with respect to previous, electronics-free belts can be carried over with only small changes, if any.

The electronic circuit or electronic device can contain at least one sensor, for example a temperature sensor, by means of which the entry of heat into the belt or the current temperature of said belt can be determined during its operation. It is known that precisely the operating temperature of a belt is a crucial variable for assessing the harmless use period of a carrying belt, conveyor belt or drive belt.

The electronics carrier which carries the electronic components and the sensor or is connected thereto can consist of a very thin and, as seen in the circumferential direction of the belt, very short printed circuit board or of a flexible film, the latter embodiment also been known as so-called film electronics.

Furthermore, there can be provision that the electronics carrier has arranged thereon at least one digital circuit, an analog circuit, a sensor, a receiver for receiving electromagnetic waves and a transmitter for influencing or transmitting electromagnetic waves, which are signal-connected to one another.

Figure 2:
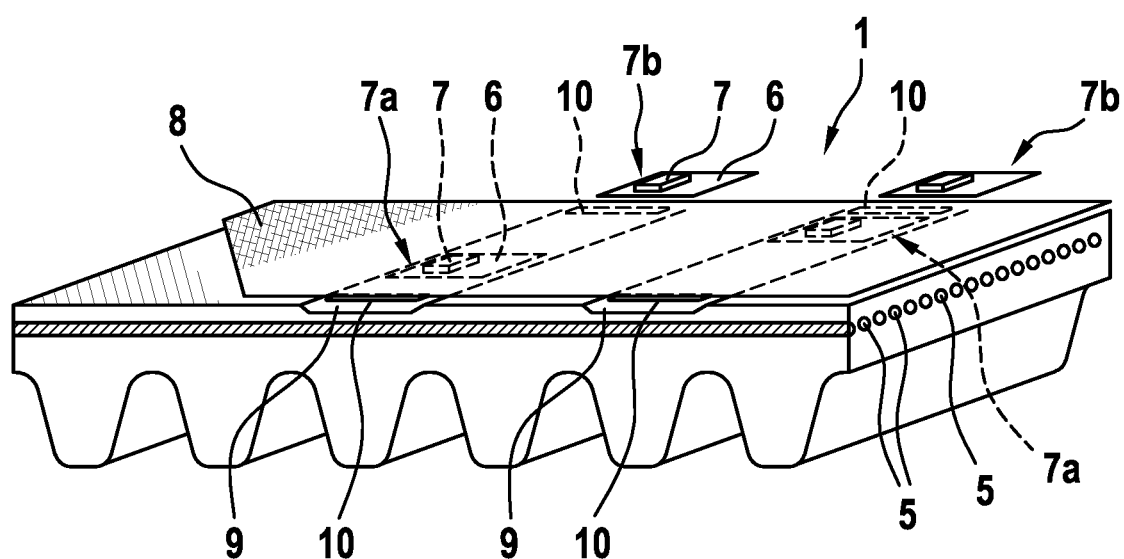
FIG. 2 shows a perspective, schematic view of a wide V-belt of the wide V-belt drive as per FIG. 1, said belt being provided with an electronic device on a carrier film.

The invention is explained more fully below with reference to an exemplary embodiment which is illustrated in the appended drawing, in which FIG. 1 shows a simple belt drive having a wide V-belt for a combine harvester, which is produced by the method according to the invention, FIG. 2 shows a perspective, schematic view of a wide V-belt of the wide V-belt drive as per FIG. 1, said belt being provided with an electronic device on a carrier film.

FIG. 1 shows, in principle, a belt drive in which a wide V-belt 1 produced according to the invention runs in a partially enwrapping manner around a driven pulley 2, a drive pulley 3, which is driven by an electric motor (not shown in further detail), and a tensioning roller 4. FIG. 2 shows a portion of the drive belt which is designed as a wide V-belt 1 and which has tension members or cords 5 arranged in the longitudinal direction. The wide V-belt 1 has an electronic circuit 7 arranged on a carrier film 6, namely a SAW sensor (surface acoustic wave sensor) for temperature measurement within the wide V-belt.

During the fabrication and before the vulcanization of the component blank for the wide V-belt, planar Teflon strips have been inserted into the blank structure in subregions of the blank and removed again after the fabrication and vulcanization, with the result that a planar empty space or interspace as receiving space 9 for the electronic circuit 7 arranged on a carrier film 6 was created below the fabric ply 8.

FIG. 2 shows, then, the electronic circuit 7 one time in the position 7a after the introduction into the receiving space 9 and one time in the position 7b before the lateral introduction into the receiving space 9. The electronic circuit 7 and the associated carrier film 6 are formed in their spatial or areal extents in such a way that the interspace or receiving space 9 is only partially filled.

After the introduction of the electronic circuit in the form of the SAW sensor on carrier film, the accesses or openings to the receiving space 9 have been closed again by melting in a thermoplastic compound 10, as can be seen from the portion of the wide V-belt shown in FIG. 2.

Examples can include subject matter such as a method, means for performing acts or blocks of the method, at least one machine-readable medium including instructions that, when performed by a machine cause the machine to perform acts of the method or of an apparatus or system according to embodiments and examples described herein.

Example 1 is a method for producing a belt- or band-shaped component (1) made of elastomer material, which is driven to run around under tensile stress and which has an electronic circuit or electronic device (7) installed in the component, the component having tension members or cords which are arranged in the longitudinal direction, wherein, during the fabrication and before the vulcanization of the component blank, planar intermediate plies or strips made of material which cannot be crosslinked by vulcanization are inserted into the blank structure in subregions of the blank,
  wherein, after the fabrication, the blank is completely vulcanized to form the component and, where appropriate, cut or trimmed,
  wherein the intermediate plies or strips are then removed from the component through correspondingly incorporated or method-intrinsically formed openings, and an electronic circuit or electronic device (7) is introduced into the thus resulting planar empty space or interspace (9) in the component, which circuit or device is designed in its spatial or areal extents in such a way that the interspace is only partially filled.

Example 2 includes the subject matter of Example 1, including or omitting optional elements, wherein the method for producing a component which is provided on at least one side with at least one fabric ply (8) which is embedded in or close to the outer surface of the traction belt, wherein, during the fabrication and before the vulcanization of the component blank, one or more planar intermediate plies or strips which are arranged adjacently to the fabric plies (8) and are made of material which cannot be crosslinked by vulcanization are inserted into the blank structure in subregions of the blank.

Example 3 includes the subject matter of any of Examples 1-2, including or omitting optional elements, in which the intermediate plies are formed as strips made of polytetrafluoroethylene (Teflon) or silicone paper.

Example 4 includes the subject matter of any of Examples 1-3, including or omitting optional elements, in which the electronic circuit or electronic device (7) is arranged on an electronics carrier (6), preferably being formed as a film circuit or as a printed circuit applied to film.

Example 5 includes the subject matter of any of Examples 1-4, including or omitting optional elements, in which the electronic circuit or electronic device (7), preferably the electronics carrier (6), is fixed, preferably adhesively bonded, via a linear, patch-like or punctiform connection, in the planar empty space or interspace.

Example 6 includes the subject matter of any of Examples 1-5, including or omitting optional elements, in which the introduced electronic circuit or electronic device (7) has a temperature sensor, preferably a SAW sensor, and the planar empty space or interspace is filled with an elastic heat-conducting paste after the introduction of the circuit.

LIST OF REFERENCE SIGNS

Part of the Description 1 drive belt, wide V-belt
2 driven pulley
3 drive pulley
4 tensioning roller
5 tension member/cord
6 carrier film
7 electronic circuit, electronic device
7a electronic circuit, position after the introduction into the receiving space
7b electronic circuit, position before the introduction into the receiving space
8 fabric ply
9 receiving space/planar empty space or interspace
10 melted-in thermoplastic compound

The invention claimed is:

1. A method for producing a component made of an elastomer material and having tension members arranged in the longitudinal direction and the component being a belt, the method comprising:
  inserting planar intermediate plies which cannot be crosslinked by vulcanization into a blank structure in subregions of a blank component;
  vulcanizing the blank component to form a vulcanized component after inserting the planar intermediate plies;
  removing the intermediate plies from the vulcanized component generating interspace in the vulcanized component; and
  introducing one or more electronic devices into the interspace of the vulcanized component.

2. The method for producing a component as claimed in claim 1, further comprising:
  embedding at least one fabric ply in an outer surface of the blank component prior to vulcanizing the blank component;
  arranging one or more planar intermediate plies adjacent the at least one fabric ply, wherein the one or more planar intermediate plies are comprised of a material which cannot be crosslinked by vulcanization;
  forming openings in the outer surface and the at least one fabric plie; and
  inserting the one or more planar intermediate plies or strips into the blank structure by way of the formed openings and using a carrier film.

3. The method of claim 2, in which the intermediate plies are formed as strips made of polytetrafluoroethylene (Teflon) or silicone paper.

4. The method as claimed of claim 1, in which the electronic circuit or electronic device is arranged on an electronics carrier and is formed as a film circuit or as a printed circuit applied to film.

5. The method of claim 1, in which the electronic circuit or electronic device is adhesively bonded, via a linear, patch-like or punctiform connection, in the planar empty space or interspace.

6. The method of claim 1, in which the one or more electronic devices have a temperature sensor and the interspace is filled with an elastic heat-conducting paste after the introduction of the circuit.

7. The method of claim 1, wherein the vulcanized component is a drive belt having a drive side, a rear side and lateral surfaces, wherein the fabrication occurs on a building drum and in the form of a cylindrical blank whose length corresponds to a multiple of the drive belt width, wherein, during the fabrication and before the vulcanization of the cylindrical blank, intermediate plies or strips which extend at least over partial lengths of the cylindrical blank and are made of material which cannot be crosslinked by vulcanization are inserted into the blank structure in subregions of the blank, wherein, after the fabrication, the blank is completely vulcanized and cut into individual drive belts, wherein the intermediate plies or strips are then removed from the separated drive belts, and the electronic device is introduced into the thus resulting planar empty space or interspace.

8. The method of claim 7, in which the intermediate plies or strips are inserted into the cylindrical blank in such a way that, after the cutting or separation of the drive belts, they are accessible and removable on or from at least one lateral surface of the drive belt.

9. The method of claim 7, in which, during the fabrication of the cylindrical blank, intermediate plies or strips which extend at least over parts of the length of the cylindrical blank and are made of material which cannot be crosslinked by vulcanization are inserted in certain portions into the blank structure in subregions of the blank in such a way that the ends of the strips project out of the fabricated blank through incisions incorporated into the outer fabric plies during the fabrication.

10. The method of claim 7, in which, after introducing the electronic circuit or electronic device into the empty space or interspace, the accesses or openings to the empty space or interspace are closed again, preferably by melting on or melting in a thermoplastic compound.

11. The method of claim 10 for producing a drive belt provided with a plurality of fabric plies, in which the intermediate plies are inserted between two fabric plies, in which at least one of the fabric plies is designed to be extensible and is sewn in or welded in in strip form between the other fabric plies, and in which the fabric plies are welded or adhesively bonded to the edges of the drive belts.

12. The method of claim 1, further comprising selecting one or more circuits, sensors, receivers and transmission devices as the electronic device based on customer information prior to inserting or introducing the electronic device into the interspace.

13. The method of claim 1, further comprising filling remaining space of the interspace with a thermoplastic compound after introducing the electronic device to the interspace.

14. A method for producing a component made of an elastomer material, the method comprising:
inserting intermediate plies which cannot be crosslinked by vulcanization into a blank structure in subregions of a blank component, the intermediate plies comprise polytetrafluoroethylene;
vulcanizing the blank component to form a vulcanized component after inserting the planar intermediate plies;
removing the intermediate plies from the vulcanized component generating interspace in the vulcanized component; and
introducing one or more electronic devices into the interspace of the vulcanized component, the one or more electronic devices comprising a printed circuit applied to film.

15. The method of claim 14, the intermediate plies are in form of patches and comprise a material not crosslinked by vulcanization.

16. The method of claim 14, further comprising forming openings in the blank component prior to inserting the planar intermediate plies and melting a thermoplastic compound to close the openings after introducing the one or more electronic devices into the interspace.

17. The method of claim 16, further comprising removing the intermediate plies from the component through the formed openings after vulcanizing the blank component.

18. The method of claim 14, introducing the one or more electronic devices comprises forming a circuit having spatial extents that only partially fill the generated interspace to encapsulate the circuit and arrange the circuitry with respect to main loading directions to prevent compression and tensile loading on the circuitry.

19. The method of claim 18, further comprising adhesively bonding the circuitry in the generated interspace.

20. The method of claim 14, further comprising filling the interspace with heat conducting paste after inserting the one or more electronic devices, the one or more electronic devices comprise a temperature sensor.

21. The method of claim 14, introducing the one or more electronic devices comprises introducing a receiver and a transmitter only signal connected to each other.

22. The method of claim 14, specifying a plurality of measuring points after vulcanization and equipping the belt with electronics only where appropriate based on the specified measuring points.

* * * * *